United States Patent
Chen et al.

(10) Patent No.: US 9,404,298 B1
(45) Date of Patent: Aug. 2, 2016

(54) HINGE STRUCTURE

(71) Applicant: LIANHONG ART CO., LTD., Taoyuan (TW)

(72) Inventors: Chia-Hui Chen, Taoyuan (TW); Yen-Ting Chen, Taoyuan (TW); Tzu-Yu Lin, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 0 days.

(21) Appl. No.: 14/944,344

(22) Filed: Nov. 18, 2015

(51) Int. Cl.
    *E05D 1/04* (2006.01)
    *E05D 3/18* (2006.01)
    *E05D 11/00* (2006.01)
    *G06F 1/16* (2006.01)
    *E05D 11/08* (2006.01)

(52) U.S. Cl.
    CPC ............ *E05D 3/183* (2013.01); *E05D 11/0054* (2013.01); *E05D 11/082* (2013.01); *G06F 1/1681* (2013.01)

(58) Field of Classification Search
CPC ... Y10T 16/542; Y10T 16/543; Y10T 16/544; Y10T 16/5443; Y10T 16/5445; Y10T 16/5448; Y10T 16/545; Y10T 16/54038; G06F 1/16; G06F 1/1616; G06F 1/1681; G06F 1/166; G06F 1/1679; H04M 1/022; H04M 1/0214; H04M 1/0216; H04M 1/0222; H05K 5/0226; F16M 11/10; E05D 11/1021; E05D 11/1078; E05D 11/082; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606
See application file for complete search history.

(56) References Cited

U.S. PATENT DOCUMENTS

| | | | | |
|---|---|---|---|---|
| 1,618,781 | A * | 2/1927 | Reuleke | A42B 1/18 2/175.6 |
| 4,342,135 | A * | 8/1982 | Matsuo | F16F 9/12 16/225 |
| 4,642,449 | A * | 2/1987 | Baitz | G07G 1/0027 235/1 B |
| 5,061,023 | A * | 10/1991 | Soubliere | E05D 1/04 16/355 |
| 5,168,426 | A * | 12/1992 | Hoving | G06F 1/1681 16/361 |
| 5,566,424 | A * | 10/1996 | Crompton | G06F 1/1607 16/337 |
| 6,292,981 | B1 * | 9/2001 | Ford | E05D 1/04 16/357 |
| 6,317,929 | B1 * | 11/2001 | Ring | E05D 1/04 16/355 |
| 6,351,535 | B1 * | 2/2002 | Nogas | H04M 1/12 379/435 |

(Continued)

*Primary Examiner* — Chuck Mah
(74) *Attorney, Agent, or Firm* — Guice Patents PLLC

(57) ABSTRACT

A hinge structure includes a housing comprising two half-housings disposed opposite, an opening formed on a top thereof, an inner space formed by the half-housings, a cover plate configured to cover a portion of the top and a lifting member disposed in an electronic device to cover the other portion of the top, wherein a gap is formed between the cover plate and the lifting member, each of the half housing comprises a depression and a guiding groove formed in front of the depression, and the two depressions form the inner space; two half-driving members opposite disposed, mounted in the inner space and connected to the lifting member so that the half-driving members are assembled to each other and actuate in the inner space; and a sandwiched torque member disposed between the half-driving members and comprising a guiding rod having two ends movably inserted into the half-driving members and an axial torque tube having a preset notch, wherein the axial torque tube is tightly fitted to a shaft connected to the half-driving members.

4 Claims, 5 Drawing Sheets

(56) References Cited

U.S. PATENT DOCUMENTS

| | | | | |
|---|---|---|---|---|
| 7,337,499 B2* | 3/2008 | Zhang | G03G 21/1666 | 16/286 |
| 8,272,104 B2* | 9/2012 | Chen | G06F 1/1616 | 16/327 |
| 8,453,299 B2* | 6/2013 | Li | G06F 1/1624 | 16/257 |
| 8,713,757 B2* | 5/2014 | Chen | G06F 1/1616 | 16/327 |
| 8,763,206 B1* | 7/2014 | Gong | E05D 1/04 | 16/355 |
| 8,769,773 B2* | 7/2014 | Katsuta | G06F 1/1624 | 16/286 |
| 2005/0225934 A1* | 10/2005 | Homer | G06F 1/1616 | 361/679.21 |
| 2007/0180657 A1* | 8/2007 | Zeilbeck | B60R 7/06 | 16/354 |
| 2010/0299879 A1* | 12/2010 | Yang | E05D 3/04 | 16/387 |
| 2011/0023272 A1* | 2/2011 | Huang | E05D 3/18 | 16/362 |
| 2011/0216483 A1* | 9/2011 | Vesely | B60N 3/004 | 361/679.01 |
| 2012/0175478 A1* | 7/2012 | Chen | G06F 1/1624 | 248/286.1 |
| 2012/0227217 A1* | 9/2012 | Chen | G06F 1/1681 | 16/366 |
| 2016/0083989 A1* | 3/2016 | Kuo | E05D 5/10 | 16/355 |
| 2016/0097227 A1* | 4/2016 | Hsu | E05D 3/122 | 16/354 |

\* cited by examiner

HINGE STRUCTURE

BACKGROUND OF THE INVENTION

1. Field of the Invention

The invention relates to a hinge structure, and more particularly to a hinge structure used in an electronic devices and positioning a lifting member in any angular position through a simple sandwiched member.

2. Description of the Related Art

Electronic devices such as tablets which are portable devices and used to transmit or control data by touching their screens. Since the tablets are often used by both hands, users feel tired quickly. When the tablets are put on knee, it is easy to slide or shake. To solve such a problem, a stand is used to support the tablets in a predetermined angle for operation.

Conventional stands for supporting electronic devices are usually pivoted to the electronic devices at one end, and the other end becomes free end. The stand can be folded and received in the electronic device. The free end is rotated to a desired angle with respect to the pivoted end when the electronic device is used. However, such a conventional stand has an opened structure which often occupies a considerable space and a limited rotational angle. The conventional stand is also easily damaged due to impact.

The Applicant has filed an application relating to a hinge structure connecting a stand and an electronic device, and the hinge structure is flatly mounted to the electronic device through a small gap to solve the problem. However, the hinge structure still uses a torque positioning device composed of too many elements to position the stand.

BRIEF SUMMARY OF THE INVENTION

An object of the invention is to provide a hinge structure including a sandwiched torque member which simplifies the structure and the manufacturing process.

The invention provides a hinge structure. The hinge structure in accordance with an exemplary embodiment of the invention includes a housing comprising two half-housings disposed opposite, an opening formed on a top thereof, an inner space formed by the half-housings, a cover plate configured to cover a portion of the top and a lifting member disposed in an electronic device to cover the other portion of the top, wherein a gap is formed between the cover plate and the lifting member, each of the half housing comprises a depression and a guiding groove formed in front of the depression, and the two depressions form the inner space; two half-driving members opposite disposed, mounted in the inner space and connected to the lifting member so that the half-driving members are assembled to each other and actuate in the inner space; and a sandwiched torque member disposed between the half-driving members and comprising a guiding rod having two ends movably inserted into the half-driving members and an axial torque tube having a preset notch, wherein the axial torque tube is tightly fitted to a shaft connected to the half-driving members.

In another exemplary embodiment, the housing further comprises two arced portions and two arced guiding portions facing the arced portions respectively and protruding form an inner wall of the half housings; each of the half-driving members comprises an arced plate having an arced rail corresponding to the arced guiding portions.

In yet another exemplary embodiment, each of the half-driving members comprises a groove, and the shaft has two ends positioned in the grooves respectively.

In another exemplary embodiment, the sandwiched torque member comprises a main body connected to the guiding rod and a plate stacked to the main body and connected to the axial torque tube, and the main body is integrated with the plate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
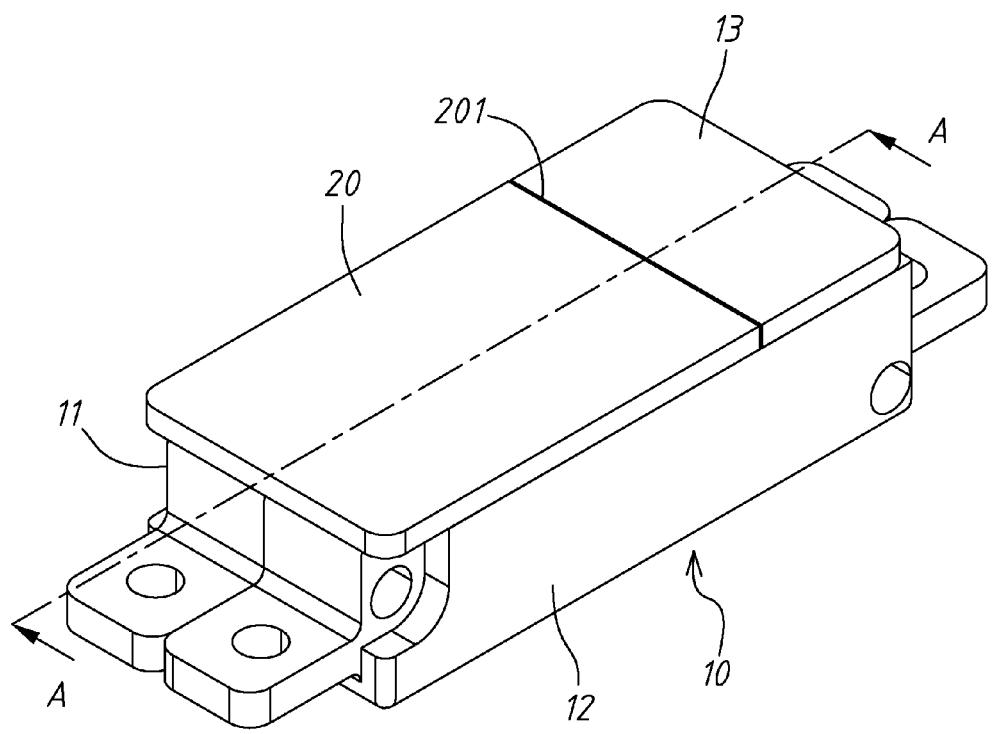
FIG. 1 is a perspective view of a hinge structure of the invention.
Figure 2:
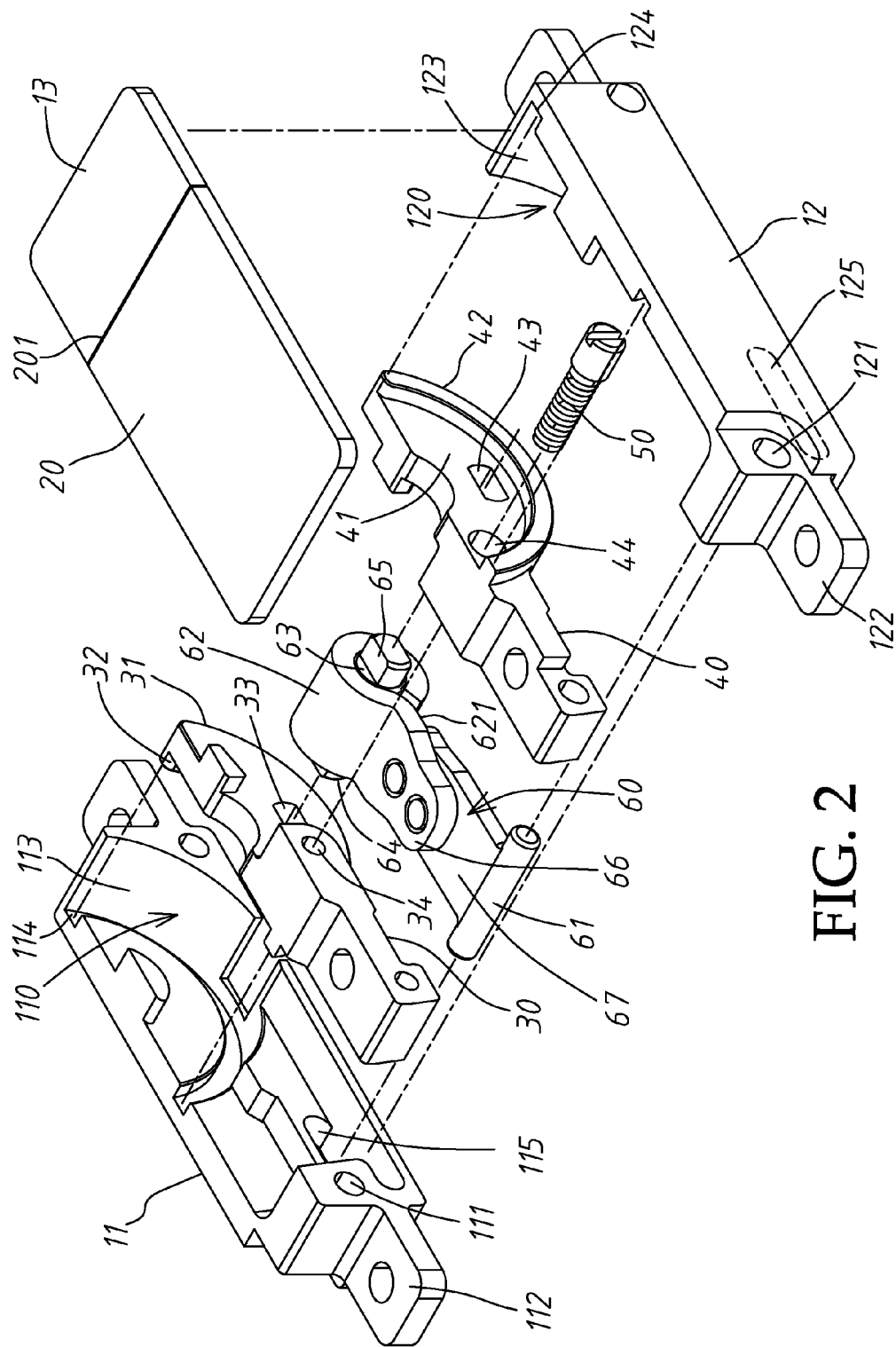
FIG. 2 is an exploded view of FIG. 1.
Figure 3:
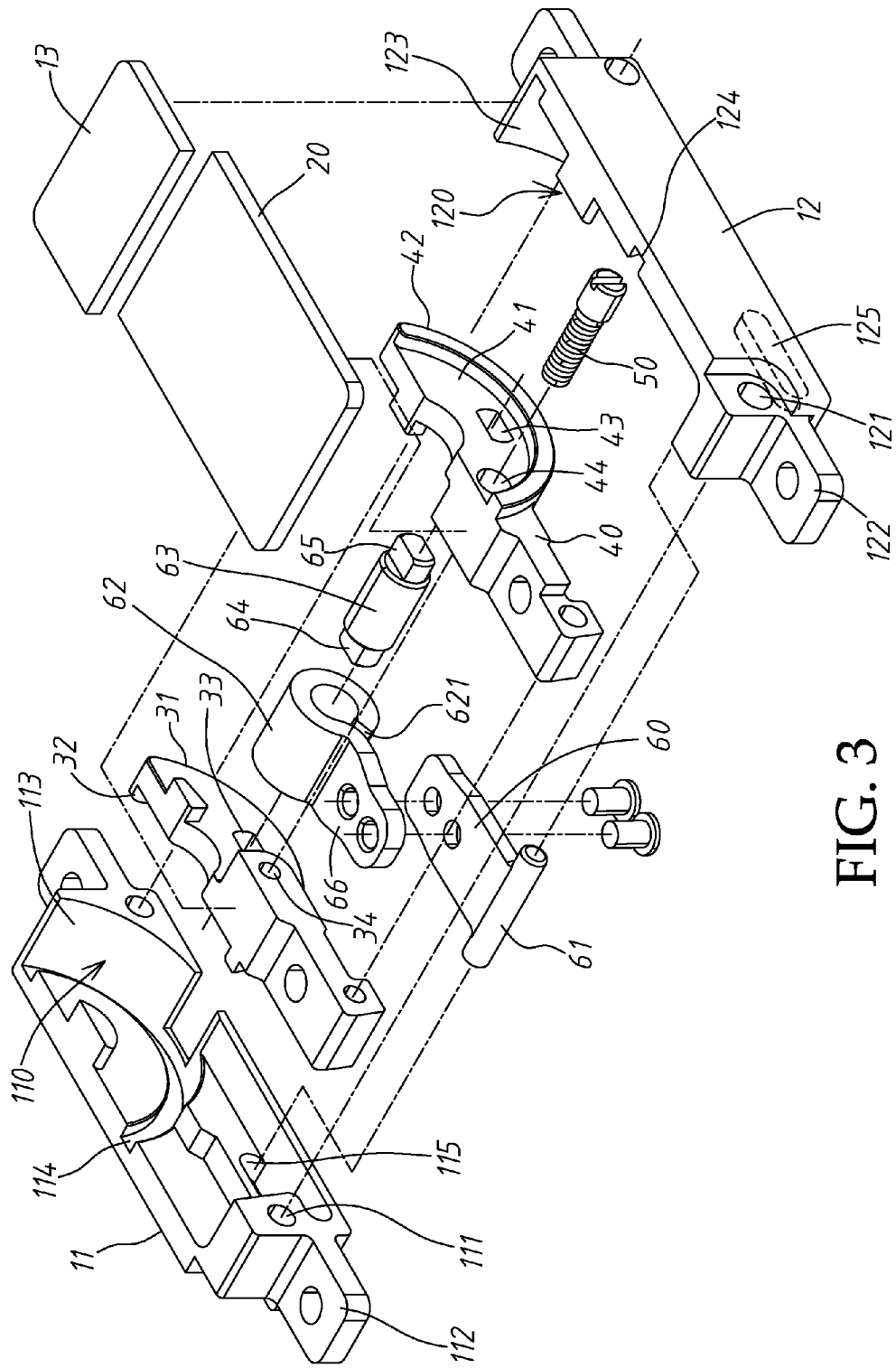
FIG. 3 is an exploded view of FIG. 2.

Referring to FIGS. 1 to 3, a hinge structure of the invention includes a housing 10. The housing 10 includes an opening formed on a top thereof and an inner space. The housing 10 further includes two half-housings 11 and 12 forming the inner space. The two half-housings 11 and 12 are assembled together through bolts screwed into holes 111 and 121. The half-housing 11 has an extending positioning plate 112, and the half-housing 12 has an extending positioning plate 122. The housing 10 further includes a cover 13 configured to cover a portion of the opening and a lifting member 20 disposed in an electronic device and configured to cover the other portion of the opening. A very small gap 201 is formed between the cover 13 and the lifting member 20. The half-housing 11 has a depression 110, and the half-housing 12 has a depression 120. The depression 110 and the depression 120 form the inner space. In this embodiment, an arced portion 113 and an arced portion 123 are formed in the inner space. The arced portion 113 faces an arced guiding portion 114 formed in the half-housing 11, and the arced portion 123 faces an arced guiding portion 124 formed in the half-housing 12. A guiding groove 115 is formed in an inner wall of the half-housing 11 and in front of the arced guiding portion 114, and a guiding groove 125 is formed in an inner wall of the half-housing 12 and in front of the arced guiding portion 124.

Two half-driving members 30 and 40 are mounted in the inner space and connected to the lifting member 20. The half-driving members 30 and 40 are fitted to the arced portions 113 and 123. The half-driving member 30 includes an arced plate 31 corresponding to the arced portion 113, and the half-driving member 40 includes an arced plate 41 corresponding to the arced portion 114. The arced plate 31 includes an arced rail 32 assembled with the arced guiding portion 114, and the arced plate 41 includes an arced rail 42 assembled with the arced guiding portion 124. The arced rail 32 includes a groove 33, and the arced rail 42 includes a groove 43. In this embodiment, the half-driving member 30 includes a plurality of screw holes 34, and the half-driving member 40 includes a plurality of through holes 44. A bolt 50 extends through the through hole 44 and screws into the screw hole 34.

A sandwiched torque member 60 is disposed between the half-driving members 30 and 40. The sandwiched torque member 60 includes a guiding rod 61 at one end and an axial torque tube 62 having a preset torque notch 621 at the other end. The guiding rod 61 is movably inserted into the guiding grooves 115 and 125. The axial torque tube 62 is tightly fitted to a shaft 63. The shaft 63 has two ends 64 and 65 positioned in the grooves 33 and 43 respectively. The sandwiched torque member 60 further includes a main body 67 connecting the guiding rod 61 and a plate 66 connected to the axial torque tube 62. The main body 67 is attacked to the plate 66 and integrated with the plate 66 by through holes.

Figure 4:
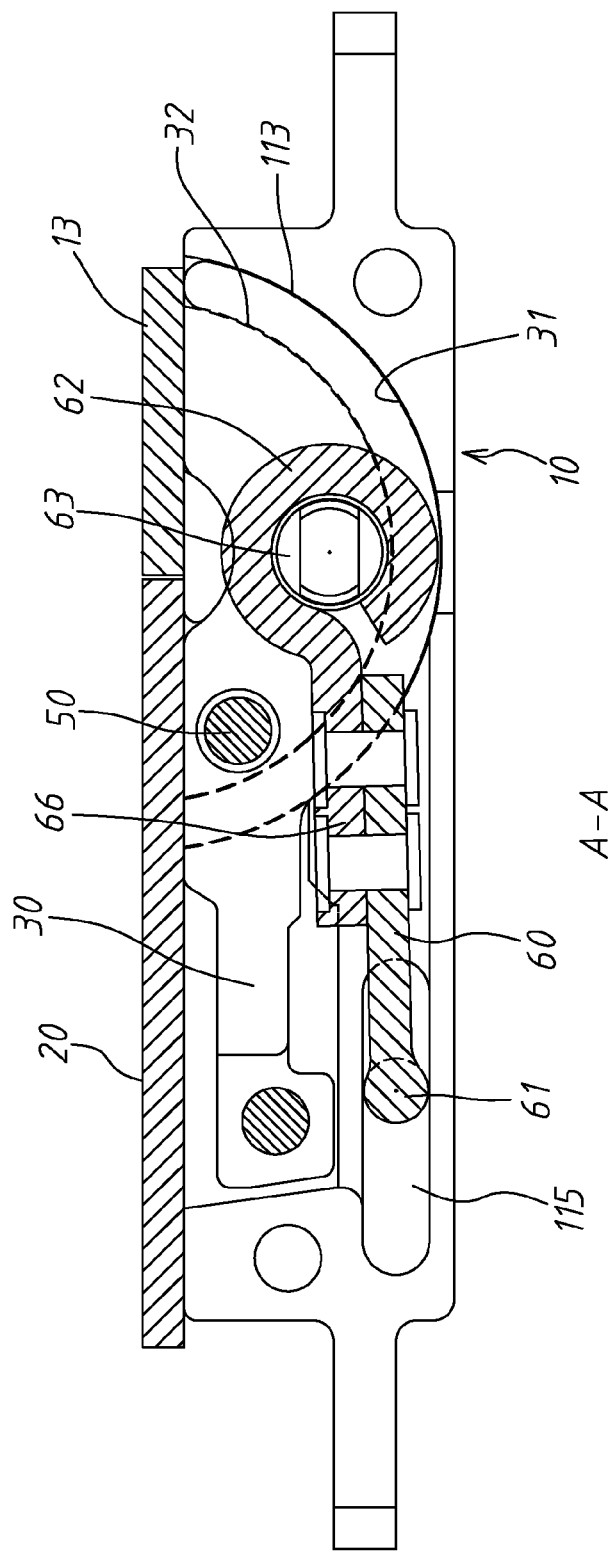
FIG. 4 is a cross section of FIG. 1 along a line A-A.
Figure 5:
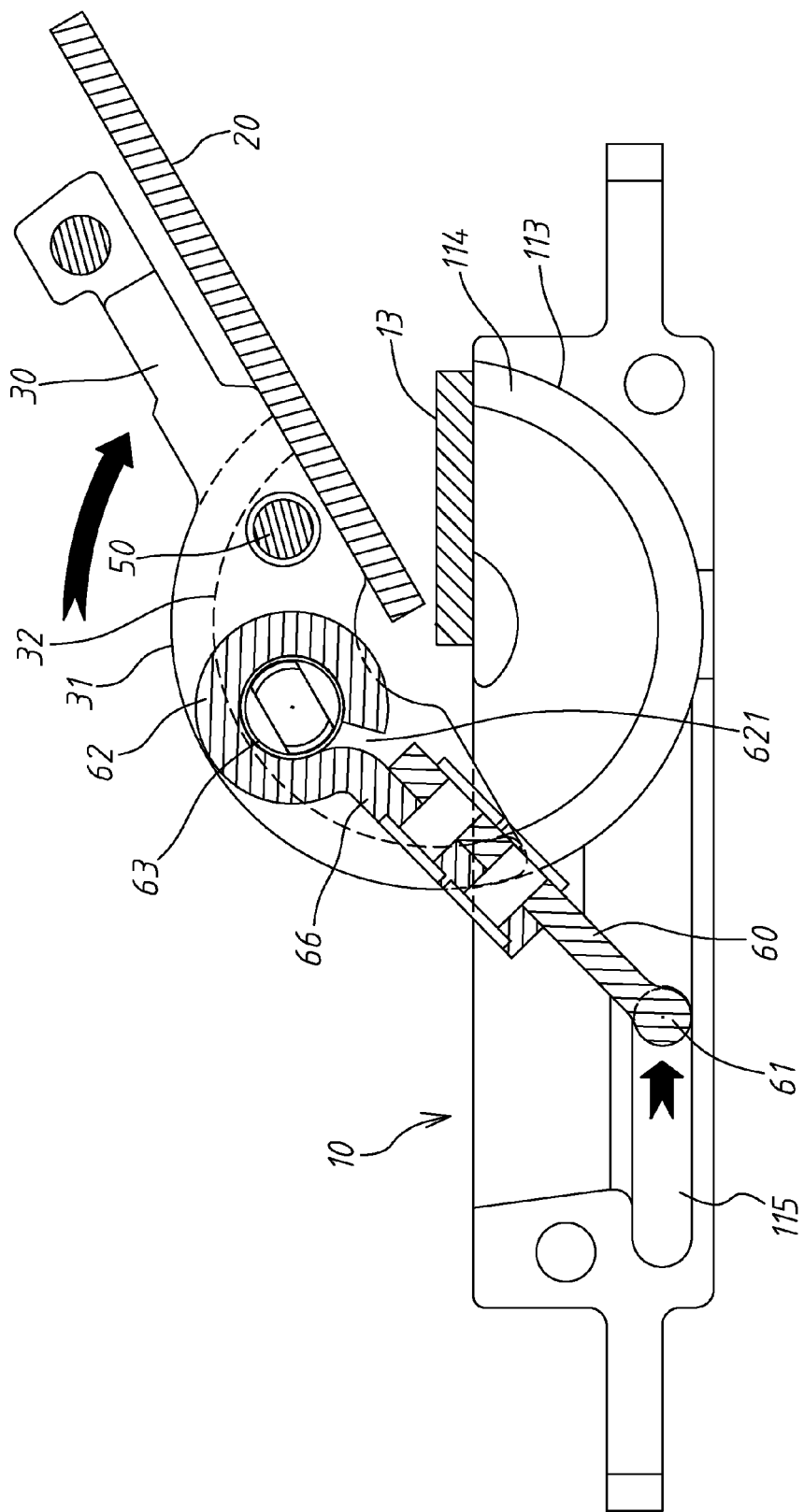
FIG. 5 depicts a lifting member which is lifted.

Referring to FIGS. 4 and 5, when the lifting member 20 is lifted, the half-driving members 30 and 40 are rotated so that the shaft 63 is rotated. As the shaft 63 is tightly fitted to the axial torque tube 62, the axial torque tube 62 clamps the shaft 63 through the torque notch 621. When the lifting member 20 is lifted, the guiding rod 61 moves along the guiding grooves 115 and 125 from one end to the other end.

The lifting member 20 of the hinge structure of the invention can be lifted to any angular position and positioned at the angular position through the sandwiched torque member 60 to maintain the small gap 201. Therefore, the hinge structure is simplified, which reduces manufacturing cost and speeds the manufacturing process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hinge structure, comprising:
  a housing comprising two half-housings disposed opposite, an opening formed on a top thereof, an inner space formed by the half-housings, a cover plate configured to cover a portion of the top opening and a lifting member disposed in an electronic device to cover the other portion of the top opening, wherein a gap is formed between the cover plate and the lifting member, each of the half housings comprises a depression and a guiding groove formed in front of the depression, and the two depressions form the inner space;
  two half-driving members opposite disposed, mounted in the inner space and connected to the lifting member so that the half-driving members are assembled to each other and actuate in the inner space; and
  a sandwiched torque member disposed between the half-driving members and comprising a guiding rod having two ends movably inserted into the guiding grooves of the half housings respectively and an axial torque tube having a preset notch, wherein the axial torque tube is frictionally fitted to a shaft connected to the half-driving members.

2. The hinge structure as claimed in claim 1, wherein the housing further comprises two arced portions and two arced guiding portions facing the arced portions respectively and protruding from an inner wall of the half housings; each of the half-driving members comprises an arced plate having an arced rail corresponding to the arced guiding portions.

3. The hinge structure as claimed in claim 2, wherein each of the half-driving members comprises a groove, and the shaft has two ends positioned in the grooves respectively.

4. The hinge structure as claimed in claim 1, wherein the sandwiched torque member comprises a main body connected to the guiding rod and a plate stacked to the main body and connected to the axial torque tube, and the main body is integrated with the plate.

* * * * *